United States Patent

[11] 3,575,654

| [72] | Inventor | Werner Volkmann<br>Munich, Germany |
|---|---|---|
| [21] | Appl. No. | 792,905 |
| [22] | Filed | Jan. 16, 1969 |
| [45] | Patented | Apr. 20, 1971 |
| [73] | Assignees | Siemens Aktiengesellschaft<br>Berlin and Munich, Germany |
| [32] | Priority | Sept. 18, 1963 |
| [33] | | Germany |
| [31] | | S87353 |
| | | Continuation-in-part of application Ser. No. 396,949, Sept. 16, 1964, now abandoned. |

[54] SERIES CONNECTION OF ALTERNATOR EXCITATION WINDING AND THYRISTOR FOR CONTROLLING THE ALTERNATOR VOLTAGE
1 Claim, 4 Drawing Figs.

[52] U.S. Cl..................................................... 321/5,
321/18, 322/28, 322/73
[51] Int. Cl..................................................... H02m 7/20,
H02p 9/30
[50] Field of Search............................................. 322/28, 73;
321/5, 8, 18

[56] References Cited
UNITED STATES PATENTS

| 3,151,288 | 9/1964 | Auizienis...................... | 322/73 |
| 3,230,443 | 1/1966 | Hallidy.......................... | 322/28 |
| 3,349,318 | 10/1967 | Poppinger..................... | 322/73 |
| 3,435,254 | 3/1969 | Volkmann..................... | 322/28 |
| 3,447,065 | 5/1969 | Kuhn............................. | 322/28 |
| 3,463,997 | 8/1969 | Dietl............................. | 322/28 |

Primary Examiner—Benjamin Dobeck
Assistant Examiner—H. Huberfeld
Attorneys—Curt M. Avery, Arthur E. Wilfond, Herbert L. Lerner and Daniel J. Tick ABSTRACT: An excitation winding of a three-phase alternator is connected in series with a thyristor. One end of the series connection is connected to one of the three terminals of the alternator and the other end of the series connection is connected through a pair of diodes to only the other two terminals of the alternator. A zero anode diode is connected across the excitation winding and constitutes a capacitance effect when no voltage is applied to the winding thus coacting with the inductance of the winding to smooth DC passing through the winding to provide a substantially continuous flow of DC in the winding.

SERIES CONNECTION OF ALTERNATOR EXCITATION WINDING AND THYRISTOR FOR CONTROLLING THE ALTERNATOR VOLTAGE

The present application is a continuation-in-part of application, Ser. No. 396,949, filed Sept. 16, 1964 and entitled, "System For Controlling Direct Current Rectified From Three-Phase Alternating Current" now abandoned.

DESCRIPTION OF THE INVENTION

My invention relates to a system for controlling direct current supplied to a load by rectification from a three-phase alternating current supply.

The control or regulation of the mean current thus supplied to a load is often effected by semiconductor controlled rectifiers, now being generically called "thyristors," regardless of the particular semiconductor material of which they are made and regardless of their particular design features. Thyristors operate as electronic latching switches which, once triggered into conductance, will continue to conduct until the applied voltage declines to a minimum value close to zero. In this respect, the performance of thyristors corresponds largely to that of thyratrons. For that reason the following also applies to the latter components.

A thyristor is fired by a pulse applied to a gate electrode if a voltage of suitable polarity is impressed between the main electrodes. The current then switched on is determined only by the feeder voltage and by the impedance of the load and can no longer be controlled by the thyristor which resumes its blocking ability only after the load current has declined below the so-called holding current value close to zero and a feeder voltage is again applied to the thyristor in the forward direction upon elapse of the so-called turnoff time.

The turnoff time is the length of time needed from the moment when the forward current passes below the holding value to the moment at which a forward voltage can again be applied with the assurance that the gate of the thyristor has reliably regained control of the forward blocking ability. This minimum interval of time depends upon many conditions, such as the particular design of the thyristor and the time curve of the applied feeder voltage.

A thyristor can be operated as a latching switch only. If a continuous variation of a median load current is desired, this current can be periodically interrupted by the thyristor under control by a firing voltage which is applied to the gate electrode and determines the ratio of the switched-off intervals to the full duration of the feeder voltage cycle period. For smoothing the load current it is advisable to connect an inductive resistance in series with the load and to also connect an inversely poled diode, called "zero anode," parallel to the series connection of load and inductive resistance. The same effect can be obtained without the use of smoothing reactor or the like inductive component, if the load itself has a high inductive component, this being the case, for example, if the load is a magnet or the excitation winding of an electrical machine.

This principle is involved in the operation of the so-called direct current chopper circuits in which the load is connected to a direct voltage source through a thyristor, and a commutating capacitor is connected through another thyristor in parallel relation to the first-mentioned thyristor. The two thyristors are alternately ignited periodically so that the load current is determined by the ratio of the turn-on intervals of the respective thyristors.

A simple possibility of controlling the mean value of a direct current with the aid of thyristors is available if the current is supplied by rectification from an alternating voltage source. In such cases a rectifier bridge network fully or partially equipped with thyristors can be employed. Aside from requiring a number of thyristors, such a rectifier system has the disadvantage that the phase position of the firing pulses must be varied only within a limited range such as less than 120 electrical degrees. This requirement causes considerable difficulties if no sinusoidal voltage is available for feeding the rectifier network, as is the case if the system is connected through a rectifier to a synchronous generator which, when operating under full load, furnishes a nearly rectangular output voltage.

The object of the invention is to provide a system for controlling the direct current supply to the excitation winding of a three-phase alternator for the purpose of regulating the generated alternating voltage with the aid of a single thyristor device.

According to my invention, the excitation winding to be energized by rectified current is connected in series with a thyristor, and this series connection has one end connected to one phase of a three-phase feeder line, and has the other end connected through two diodes to only the respective other two phases of the feeder line.

Such a system according to the invention is of particular advantage for regulating the voltage of a three-phase alternator. For this purpose, and in accordance with another feature of my invention, the field excitation winding of the alternator is directly connected to one of the three alternator output terminals and is also connected in series with a thyristor, the other end of the series connection being connected through one of two diodes to one of two other alternator output terminals and through the other of the two diodes to the other of the two other alternator output terminals.

In order that the present invention may be readily carried into effect, it will now be described with reference to the accompanying drawings, wherein.

Figure 1:
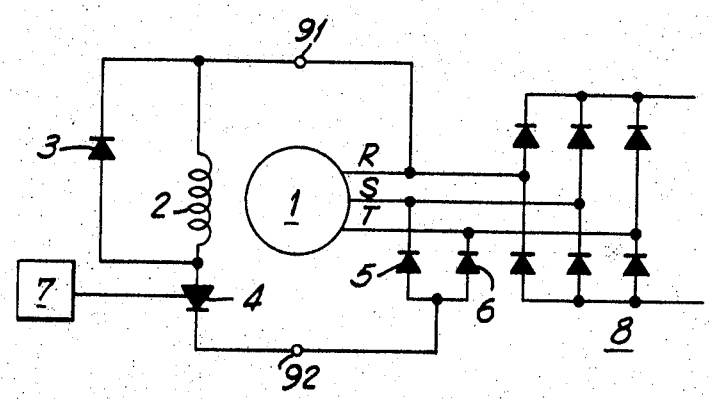
FIG. 1 is a circuit diagram of an embodiment of an alternator regulating system of the present invention.
Figure 3:
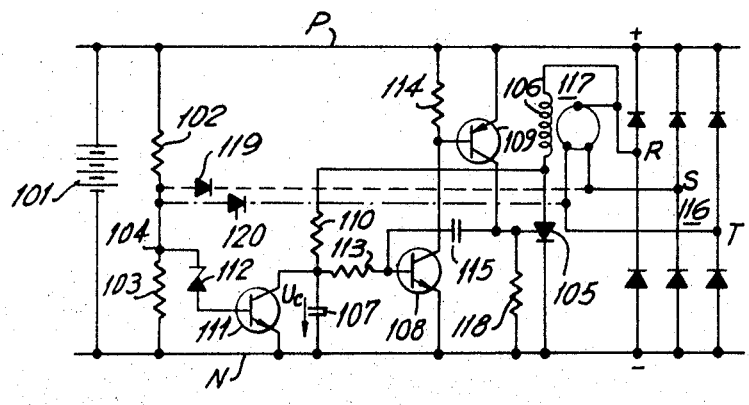
Figure 4:
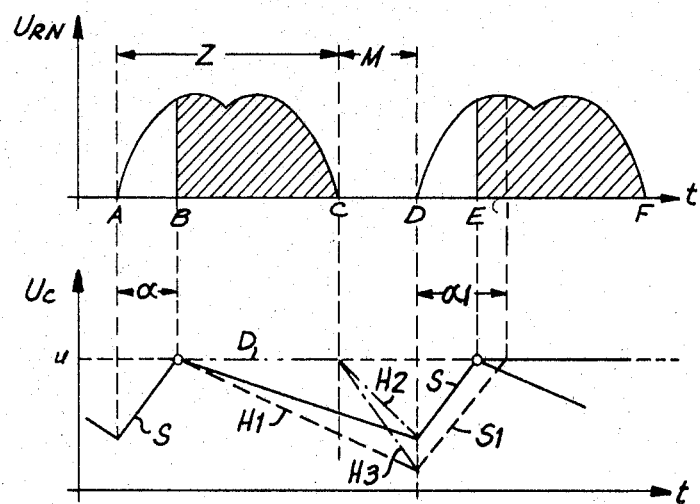

FIG. 3 is a circuit diagram of an embodiment of a control system which may be utilized as the control unit 7 of FIG. 1 and is FIG. 1 of U.S. Pat. No. 3,349,318, issued Oct. 24, 1967; and FIG. 4 is a graphical illustration of the operation of the system of FIG. 3, and is FIG. 3 of U.S. Pat. No. 3,349,318.

As will be more fully explained hereinafter, the variation of the mean direct current magnitude in a system according to the invention is based upon the principle of phase control or delayed commutation control as conventionally applied in rectifiers and inverters. The application of this phase-control principle for controlling a direct voltage is made possible by the particular type of rectifier connection which, as exemplified by the diagram in FIG. 2, furnishes a periodically intermittent voltage of which each full cycle is composed of an active pulse interval and a voltage gap or zero-voltage interval. If the frequency of the alternating voltage is so chosen that the zero-voltage intervals between each two voltage-pulse intervals are longer than the turnoff time of the thyristor, the thyristor becomes extinguished after the termination of each voltage pulse.

In the system illustrated in FIG. 1, a three-phase source of alternating voltage is constituted by an alternator 1 whose output terminals are denoted by R, S and T. The field excitation winding 2 of the alternator is connected at a terminal 91 to the alternator output terminal R. The other end of the excitation winding 2 is connected in series with a thyristor 4, such as a silicon controlled rectifier, and through a terminal 92 with two diodes 5 and 6 having the same poling. The diode 5 is connected to the alternator output terminal S, and the diode 6 to the alternator terminal T. The alternator terminals are further shown connected with a full-wave rectifier bridge network 8.

A zero anode 3, constituted by a diode, is connected parallel to the winding 2 and constitutes a capacitance which is effective during those periods in which no voltage pulse is applied to the field winding 2, thus coacting with the inductance of winding 2 to smooth the direct current passing through the winding. As a result, a substantially continuous flow of direct current in winding 2 is secured.

The gate circuit of thyristor 4 receives periodic firing pulses from a control unit 7. The phase position of the firing pulses, relative to the voltage pulses of the intermittent voltage occurring periodically between the terminals 91 and 92, can be varied in dependence upon a control voltage supplied to the control unit 7. The control voltage preferably is constituted by the departure of the rectified voltage of rectifier 8 from a given datum value. In this manner, the direct voltage available from the rectifier 8 can be regulated to a constant value.

Figure 2:
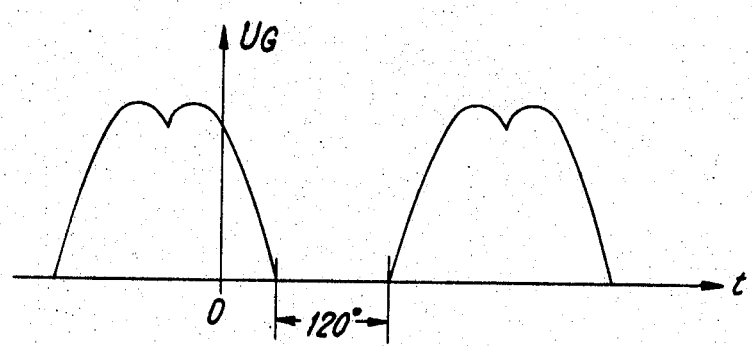
FIG. 2 is a voltage-time graphical presentation illustrating the performance of the system of FIG. 1.

As mentioned, the voltage pulses occurring between the terminals 91 and 92 during the periods in which the thyristor 4 is blocked, are represented in FIG. 2 in which the abscissa denotes time $t$ and the ordinate represents the amplitude of the rectified voltage $U_G$.

The effect of the above-described phase control is to trigger the thyristor 4 into conductance at a periodically recurring moment within each pulse interval, for example, always at the moment $t_1$ or always at the moment $t_2$, the particular firing moment depending upon the aforementioned control voltage constituted by the error between the voltage to be regulated and a predetermined datum value.

Various forms of condition-responsive firing circuits for thyristors are well known as such and the particular firing circuit used is not essential to the present invention proper. If desired, reference with respect to suitable firing circuits may be had, for example to the Silicon Controlled Rectifier Manual, second edition 1961, published by General Electric Company. A complete control system of the type described above and including details of a firing circuit is illustrated and described in the copending application of H. Poppinger, Ser. No. 396,950, filed concurrently herewith, and in U.S. Pat. No. 3,009,091, issued Nov. 14, 1961.

In FIG. 3, which is FIG. 1 of U.S. Pat. No. 3,349,318, a generator 117 is a three-phase synchronous machine operating at greatly variable speeds and in different directions of rotation. The generator 117 may comprise, for example, the generator of a railroad car utilized to energize the lighting circuits. In this case, the generator 117 is required to operate together with a storage battery in order to supply the lighting installation of a railroad car with voltage exhibiting smallest feasible voltage fluctuations despite the changes in generator operating conditions.

A battery 101 is connected to buses P and N which are energized by the generator 117 through a full-wave rectifier 116. A voltage divider formed by two resistors 102 and 103 is connected between the buses P and N. The voltage divider 102, 103 has a tap 104 to provide a voltage.

A thyristor 105, such as a silicon controlled rectifier, controls the excitation current for a field winding 106 of the generator 117. The field winding 106 in the embodiment of FIG. 3 constitutes the load to be controlled by the thyristor 105. The gate circuit of the thyristor 105 includes a capacitor 107 whose voltage $U_c$, acting through a transistor 108 and an auxiliary transistor 109, determines the firing time point of said thyristor.

The capacitor 107 is connected in series with a resistor 110 across the main path of the thyristor 105, so that the charging of said capacitor is determined by the blocking voltage of the thyristor. The emitter-collector path of a control transistor 111 is connected in parallel with the capacitor 107. The base of the transistor 111 is connected through a Zener diode 112 to the tap 104 of the voltage divider 102, 103, so that the transistor 111 is controlled by the voltage output of said voltage divider.

The base of the transistor 108 is connected through a resistor 113 to the capacitor 107. The ohmic resistor 113 may also be replaced to advantage by a Zener diode. When the transistor 108 is in its conductive condition, a voltage drop occurs across a resistor 114 connected in the collector circuit of said transistor. The voltage drop across the resistor 114 displaces the voltage at the base of the auxiliary transistor 109 to such an extent that the transistor 109 is switched to its conductive condition and supplies a control current to the gate of the thyristor 105. The thyristor 105 is fired to its conductive condition by the control current from the transistor 109 and conducts excitation current passing through the field winding 106 of the generator 117.

The collector electrode of the transistor 109 is connected through a capacitor 115 to the base electrode of transistor 108. This feedback connection permits rapid switching of the transistors 108 and 109.

In order to explain the operation of the control system of FIG. 3, reference is now made to the voltage-time curves of FIG. 4, in which the ascissa denotes time $t$ and the ordinates denote voltage amplitudes.

The upper graph in FIG. 4 shows the time curve of the feeder voltage $U_{RN}$ applied to the generator field winding 106. The voltage $U_{RN}$ is an intermittent direct voltage. The illustrated voltage curve occurs in a load, such as the winding 106, if the load has one end connected through parallel diodes or half-wave rectifiers to two phases S and T of a three-phase feeder line and has the other end directly connected to the third phase R of the three-phase feeder line, as shown in FIG. 3. This particular connection is in accordance with the energizing circuit disclosed in the present application filed concurrently with the application on which U.S. Pat. No. 3,349,318 issued and assigned to the assignee of the present invention.

It will be readily recognized that the intermittent direct voltage is periodical and that each cycle period comprises two successive intervals Z and M. The voltage has finite values only during the interval Z, so that energizing current can flow and firing of the thyristor may occur only during said interval. For this reason, the active voltage interval Z is herein called the "active interval" or the "firing interval." In the next succeeding interval M, which occurs between successive voltage intervals Z, the voltage is zero. The interval M is called the "zero interval" or the "measuring interval." Due to the fact that the intermittent voltage is zero, it is possible to control the median value of the direct current by means of a single thyristor 105 without requiring special means for periodically extinguishing the thyristor.

It is sufficient to periodically supply to the thyristor a firing pulse having a phase position within the firing interval which may be varied in dependence upon a control voltage, during the firing intervals Z. At the end of each firing interval Z, the thyristor 105 is automatically extinguished and becomes nonconductive because the driving feeder voltage in the next successive intermediate or measuring interval M is zero. This is predicated upon the requirement that the measuring interval M have a duration at least equal to the recovery time of the thyristor utilized.

The gate circuit of the thyristor 105 in FIG. 3 always receives a firing current when the capacitor voltage $U_c$ of the capacitor 107 attains a given critical limit value $u$. The course of the voltage of the capacitor 107 in dependence upon time is illustrated in FIG. 4 in the lower curves in the same time relation as the curve of the feeder voltage. The limit value $u$ is shown.

It is first assumed that the operation is such that the capacitor voltage $U_c$ corresponds to the solid line time curve S,H of FIG. 4. It is also assumed that the thyristor 105 is blocked and that at that time instant A the feeder voltage at said thyristor commences to increase from zero. Consequently, commencing at the instant A, the capacitor 107 is charged continuously. The increasing capacitor voltage is represented by the solid line S.

When the capacitor voltage $U_c$ reaches the limit value $u$ at the time instant B, the trigger stage formed by the transistors 108 and 109 of FIG. 3 is triggered and a pulse is supplied to the thyristor 105. Consequently, the thyristor 105 fires to its conductive condition and remains conductive until the end of the firing interval Z, which terminates at the time instance C.

The voltage of the capacitor 107 cannot increase after the time instant B. The voltage of the capacitor 107 decreases continuously after the instant B. The decrease of the voltage of the capacitor 107 may follow the solid line H of FIG. 4, in dependence upon the control condition of the transistor 111. The emitter-base path of the transistor 111 receives a voltage which is proportional to the amount by which the direct voltage across the buses P and N departs from a reference value determined by the Zener diode 112.

The feeder voltage impressed upon the thyristor 105 becomes zero at the time instant C and the thyristor extinguishes and becomes nonconductive shortly thereafter, so that the capacitor 107 again receives charging current and is charged beginning with the time instant D. The capacitor voltage again reaches the limit value $u$ at the time instant E and the thyristor 105 is again fired and becomes conductive.

As long as the voltage between buses P and N does not change, the control condition and hence the conduction condition of the transistor 111 remains the same. Consequently, at the end of each measuring interval M, the capacitor 107 is always at the same potential level from which it is recharged at the commencement of each new firing interval Z. The relative phase angle $\alpha$ is thus constant, independently of the feeder voltage frequency, as long as the magnitude of the control current through the base of the transistor 111 does not change.

If the voltage between the buses P and N increases, however, so that the emitter-base voltage of the transistor 111 also increases, the capacitor 107 has a lower voltage at the end of the measuring interval M. In such a case, the capacitor voltage is represented in FIG. 4 by broken lines $H_1$, $S_1$. Since the charging of the capacitor 107, proceeding in accordance with the line $S_1$ and commencing at the beginning of the firing interval, is constant and virtually independent of the control voltage applied to the transistor 111, the phase delay angle $\alpha_1$ is greater than the delay angle $\alpha$. This causes a reduction in the magnitude of the voltage between the buses P and N.

As hereinbefore mentioned, the results obtainable with the system of the present invention, especially the stability of the regulating operation, may be considerably increased if the discharge of the capacitor 107 is blocked during the firing interval Z and is shifted into the measuring interval M. A corresponding blocking or making nonconductive of the transistor 111 during the firing interval is obtainable, as shown in FIG. 3, by the utilization of two diodes 119 and 120 connected between the tap 104 of the voltage divider 102, 103 and the respective terminals S and T of the generator 117. This causes the tap point 104 to be virtually connected to the bus N during the firing interval, so that no current can flow through the base circuit of the transistor 111. The diodes 119 and 120 conduct only during the measuring interval M, so that the transistor 111 is conductive during this interval to an extent depending upon the amount by which the voltage between the buses P and N differs from the reference value determined by the Zener diode 112.

The time curve of the capacitor voltage $U_c$ in such a case is simplified and indicated in FIG. 4 by the broken lines $D_2$ and $H_2$ for a relatively slight regulating departure and by the lines $D_2$ and $H_3$ or a greater departure. The charging of the capacitor 107 occurs in substantially the same manner hereinbefore described. The charging of the capacitor 107, however, is not affected by the amount of the regulating departure or regulating error because the transistor 111 is completely blocked or nonconductive during the firing interval Z. The voltage of capacitor 107 again reaches the limit value $u$ at the instant B. Since the thyristor 105 fires and becomes conductive at this moment, the capacitor 107 cannot be charged further.

Since the transistor 111 is nonconductive the capacitor 107 can discharge only through the resistor 118 and the load path of the thyristor 105, as well as through the resistor 114 and the base circuit of the transistor 108. This discharge can be virtually entirely prevented by connecting a decoupling diode in series with the resistor 110 and replacing the resistor 113 with a Zener diode. In the latter case, the capacitor voltage $U_c$ remains approximately constant until the end of the firing interval Z, as ideally shown by the broken line $D_2$ in FIG. 2. The capacitor 107 is discharged through the emitter-collector path of the transistor 111 only when the measuring interval M begins. The value of the voltage at the end of the measuring interval M, that is, at the instant D, is dependent upon the magnitude of the direct voltage between the buses P and N.

While in the foregoing reference is made to a single thyristor 4, it will be understood that two or more thyristors may be connected in parallel in order to be conjointly controlled by the same firing circuit, if the load current to be controlled exceeds the rating of a single thyristor. The same applies to each of the two diodes 5 and 6.

To those skilled in the art it will be obvious upon a study of this disclosure that various other modifications are applicable, and that a system according to the invention is amenable for purposes other than particularly described herein, without departing from the essential features of my invention and within the scope of the claims annexed hereto.

I claim:

1. A system for controlling three-phase alternating voltage, comprising a three-phase alternator having three terminals and having an excitation winding, a thyristor and two diodes, said winding forming a series connection with said thyristor, and said series connection having one end directly connected to one of said terminals and having the other end connected to only said other two terminals through said respective diodes, and zero anode means connected across said excitation winding, said zero anode means constituting a capacitance effect when no voltage is applied to said excitation winding thus coacting with the inductance of said excitation winding to smooth DC passing through said excitation winding to provide a substantially continuous flow of DC in said excitation winding.